(12) United States Patent
Tsuchiya

(10) Patent No.: US 6,447,272 B2
(45) Date of Patent: Sep. 10, 2002

(54) BLOWER

(75) Inventor: Mitsugu Tsuchiya, Kitasaku-gun (JP)

(73) Assignee: Minebea Co., Ltd., Nagano-ken (JP)

(*) Notice: Subject to any disclaimer, the term of this patent is extended or adjusted under 35 U.S.C. 154(b) by 0 days.

(21) Appl. No.: 09/726,453

(22) Filed: Dec. 1, 2000

(30) Foreign Application Priority Data

Dec. 24, 1999 (JP) .............................. 11-367526

(51) Int. Cl.[7] .......................... F04B 17/00; H02K 15/00
(52) U.S. Cl. ................ 417/423.12; 417/354; 417/423.1; 310/42; 310/63
(58) Field of Search .................... 417/423.12, 423.14, 417/354, 423.1; 310/42, 62, 63; 415/220, 216.1

(56) References Cited

U.S. PATENT DOCUMENTS

| | | | |
|---|---|---|---|
| 4,197,054 A | * 4/1980 | Morrill | 416/93 R |
| 4,689,507 A | * 8/1987 | Baker et al. | 310/62 |
| 4,900,957 A | * 2/1990 | Baker et al. | 310/62 |
| 6,091,176 A | * 7/2000 | Wolf, Jr. et al. | 310/90 |
| 6,137,197 A | * 10/2000 | Taniguchi et al. | 310/67 R |

* cited by examiner

Primary Examiner—Charles G. Freay
Assistant Examiner—Michael K. Gray
(74) Attorney, Agent, or Firm—Oliff & Berridge

(57) ABSTRACT

In a blower in which an impeller (8), a motor yoke (11) and the like are attached to a shaft which is supported by bearings (4), (5), and a stator core (16) is arranged inside of the motor yoke (11), an annular groove (19) is provided at one end portion of the shaft (6) around its periphery and a central portion of the motor yoke (11) that is formed in a cup-shape is press-fitted and fixed to the annular groove (19). Since a zinc die-cast-made boss that has been conventionally needed may be dispensed with, the structure may be simplified and the assembling work may be performed without fail.

6 Claims, 5 Drawing Sheets

BLOWER

BACKGROUND OF THE INVENTION

1. Field of the Invention

The present invention relates to an improvement of a blower for use in a variety of OA equipments and the like.

2. Description of the Related Art

In a variety of OA equipments, since a number of electronic circuits are received in a box of their equipments, it is difficult to radiate heat generated in electronic parts that constitute the electronic circuits. For this reason, there is a fear that some of the electronic parts would be damaged or deteriorated. In particular, in a recent trend that the OA equipments are to be downsized or miniaturized, a quantity of heat generated is not reduced so much, nevertheless, the equipment is downsized so that a countermeasure against the heat becomes one of the important technical tasks. For this reason, a ventilation hole is formed in a side wall of the equipment and a blower is mounted on the equipment through the hole to thereby discharge the internal heat outside the equipment, preventing the disadvantage caused by the heat generated internally.

An example of a blower that has been frequently used will now be described with reference to FIG. 5. Reference symbol 1 denotes a casing that is formed in cylindrical shape. A housing 2 is formed integrally with this casing 1 at the center. A cylindrical bearing liner 3 is fitted around the housing's central portion. Outer races of bearings 4 and 5 are supported inside the bearing liner 3 and a shaft 6 having a uniform diameter is supported at two positions in inner races of the bearings 4 and 5. A ring 7 is mounted at the lower end of the shaft 6 to thereby prevent the shaft 6 from coming out and position the shaft 6 in the axial direction.

Reference symbol 8 denotes an impeller in which blades 10 are formed of synthetic resins around an outer periphery of a cylindrical body 9. A cup-shaped motor yoke 11 is inserted into the body 9 of the impeller 8. The motor yoke 11 is engaged with an upper end of the shaft 6 through a zinc die-cast-made boss 12. A knurling groove 13 is formed around the top end of the shaft 6 to thereby enhance the close contact when the boss 12 is formed. A ring-shaped magnet 14 is fixed by adhesives to an inner periphery of the motor yoke 11, which forms a rotary part.

A stator core 16 around which a stator wire is coiled (hereinafter, referred to as "stator coil 15") is arranged on the outside of the bearing liner 3 the stator core 16 is fixed to the bearing liner 3 to form a stationary part. A PC board 17 on which electronic circuits composed of electronic parts are installed as a brushless motor is mounted on a lower portion of the stator core 16. The electronic circuits incorporated into this PC board 17 control electric current for rotating the rotary part relative to the stationary part. The stator coil 15 and the electronic circuits incorporated into the PC board 17 are connected to each other through a lead wire (not shown). A lead wire 18 is connected to the PC board 17 for supplying electric power to the PC board 17.

The thus constructed blower is used under such a circumstance that it is mounted in the ventilation hole formed on the housing of the OA equipment. The mounting work of this blower is carried out in such a manner that the upper side of the fan in the drawing is directed to the outside of the housing of the OA equipment with the shaft 6 being directed in the horizontal direction. When a predetermined voltage is supplied from a power source to the lead wire 18 under this state, the electric current controlled by a control circuit on the PC board 17 is caused to flow through the stator coil 15 so that the rotary part is rotated by a magnetic interference action between the magnetic flux generated in the stator core 16 and the magnetic flux generated by the magnet 14. The rotation of the impeller 8 enables the air at the lower part in the housing in the drawing to be sucked and the air is discharged outside the upper part in the drawing. With this air flow operation, the interior of the housing is cooled.

Since the blower has the above-described structure in which the motor yoke is fixed through the zinc die-cast-made boss to the shaft, particularly in case of a miniaturized motor, the parts to be jointed are complicated in structure. Accordingly, there is a problem that the mechanical strength is unstable. Also, the zinc die-cast causes an increase of the assembly cost.

SUMMARY OF THE INVENTION

The present invention has been made in view of the above, and an object of the present invention is therefore to provide a blower that is suitable for use in severe circumstances.

In order to overcome the above-noted problems, according to a first aspect of the present invention, in a blower constructed by arranging bearing sat the center of a cylindrical casing, attaching an impeller, a motor yoke and the like to a shaft which is supported by the bearings, and arranging a stator core inside the motor yoke, it is characterized in that an annular groove is provided at one end portion of the shaft having a uniform diameter, and a central portion of a body on which the motor yoke or the impeller that is formed in a cup-shape is mounted is press-fitted and fixed to the annular groove. Incidentally, the "blower" referred to herein means an axial flow fan motor and a centrifugal fan motor, and the centrifugal fan motor further includes a cross-flow type and motor impelling type.

Also, according to a second aspect of the invention, in the first aspect of the present invention, it is characterized in that a shape of the annular groove is arcuate in section.

Furthermore, according to a third aspect of the present invention, in the first aspect of the invention, it is characterized in that a shape of the annular groove is V-shaped in section.

With the structure according to each aspect of the present invention, since a zinc die-cast-made boss that has been conventionally used may be dispensed with, the shaft may be fitted directly to the central portion of the motor yoke. Accordingly, the structure may be simplified but the mechanical strength thereof is enhanced. Furthermore, it is therefore possible to provide a blower less costly.

DETAILED DESCRIPTION OF THE PREFERRED EMBODIMENTS

Figure 1:
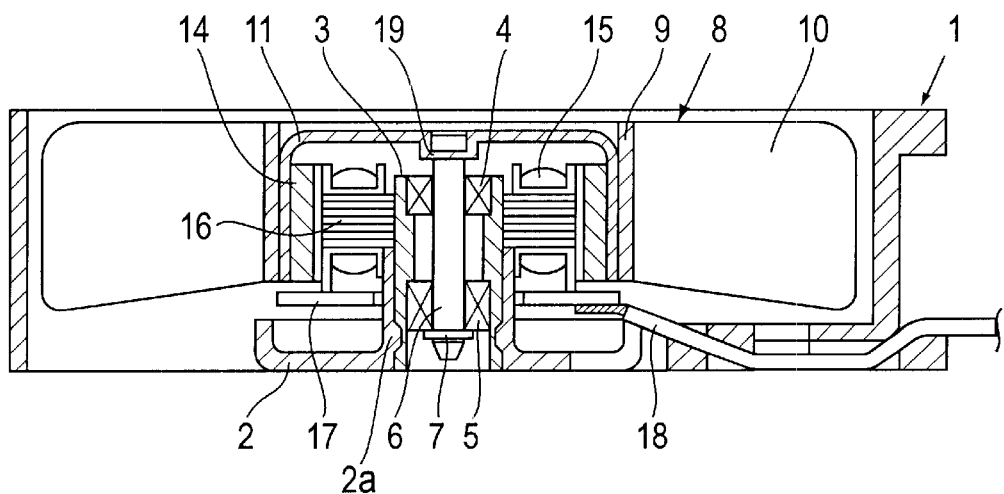
FIG. 1 is a longitudinal sectional view showing a blower according to an embodiment of the present invention.

An embodiment of the present invention will now be described with reference to FIG. 1. Reference symbol 1 denotes a casing that has a cylindrical shape. A housing 2 is formed integrally with this casing at the center where a tubular bearing liner 3 is fitted in the housing's central portion 2a. Outer races of bearings 4 and 5 are supported inside the bearing liner 3 and a shaft 6 is supported at two positions by inner races of the bearings 4 and 5. A ring 7 is mounted at the lower end of the shaft 6 to thereby prevent the shaft 6 from coming out and to position the shaft 6 in the axial direction.

Figure 2:
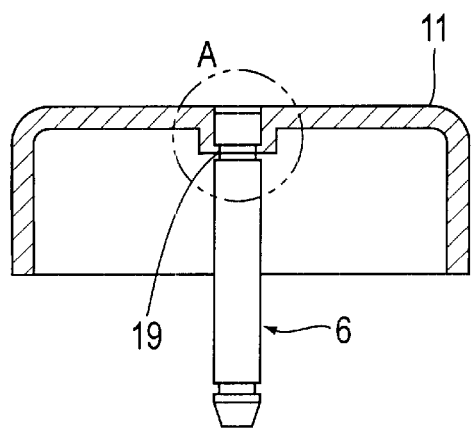
FIG. 2 is a cross-sectional view showing a joint portion between a shaft and a motor yoke shown in FIG. 1.

Reference symbol 8 denotes an impeller in which blades 10 are formed of synthetic resins around an outer periphery of a cylindrical body 9. The body 9 of the impeller 8 is fitted and fixed to the outer periphery of a cup-shaped motor yoke 11. The shaft 6 is directly fitted and inserted to the central portion of the motor yoke 11 as indicated by a circled part A of FIG. 2. As apparent from FIGS. 3 and 4 that show this part on an enlarged scale, an annular groove 19 is provided at one end portion of the shaft 6 that has a uniform diameter and the central portion of the motor yoke 11 that is formed in a cup-shape is press-fitted to the annular groove 19.

Figure 3:
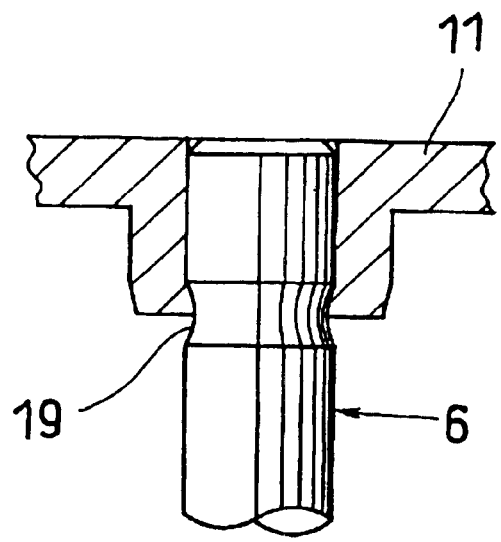
FIG. 3 is a cross-sectional view showing an example of an enlarged part A shown in FIG. 2.
Figure 4:
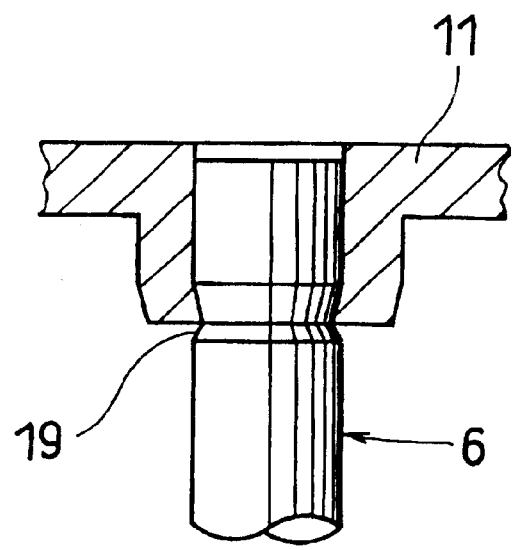
FIG. 4 is a cross-sectional view showing another example of an enlarged part A shown in FIG. 2.
Figure 5:
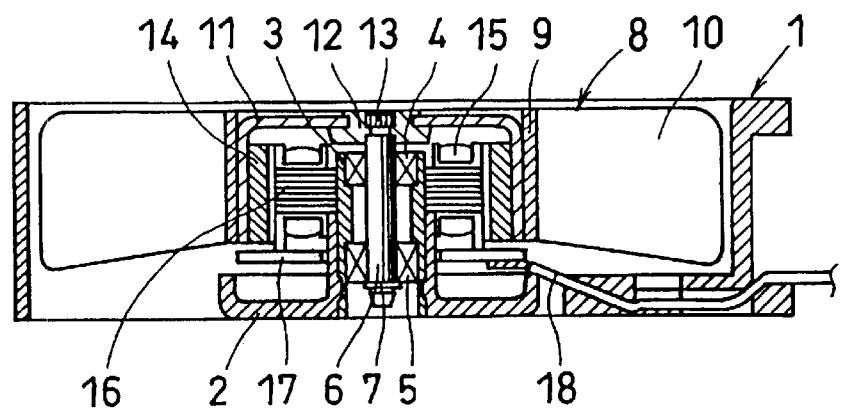
FIG. 5 is a longitudinal sectional view showing a conventional air fan.

The shape of the annular groove 19 is preferably formed into an arcuate form as shown in FIG. 3 or into a V-shape in section as shown in FIG. 4. When it is formed into an arcuate form, it is easy to manufacture the annular groove, and when it is formed into a V-shaped shape in section, it enhances the coupling strength with the motor yoke 11. Incidentally, the ring-shaped magnet 14 is fixed with adhesives to the inner periphery of the motor yoke 11 to form the rotary part, which is the same as the conventional case.

A stator core 16 around which a stator wire is coiled (the stator coil 15) is arranged on the outside of the bearing liner 3 and the stator core 16 is fixed to the bearing liner 3 to form a stationary part. A PC board 17 on which electronic circuits composed of electronic parts are installed as a brushless motor is mounted on a lower portion of the stator core 16. The electronic circuits incorporated into this PC board 17 control electric current for rotating the rotary part relative to the stationary part. The stator coil 15 and the electronic circuits incorporated into the PC board 17 are connected to each other through a lead wire (not shown). A lead wire 18 is connected to the PC board 17 for supplying electric power to the PC board 17.

Figure 6:
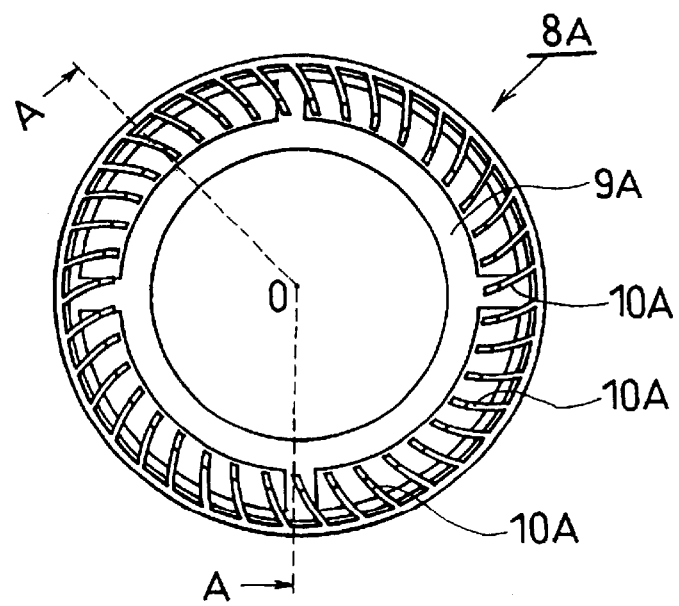
FIG. 6 is a frontal view independently showing an impeller having a different structure.
Figure 7:
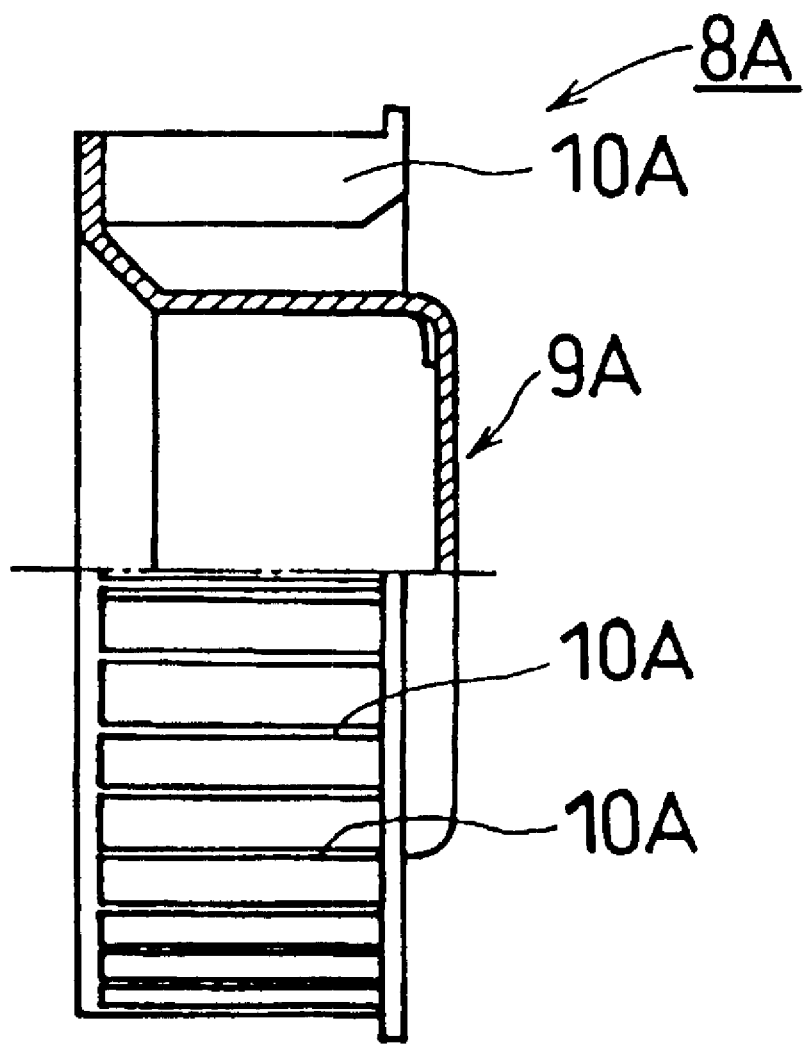
FIG. 7 is a side elevational view and a half cross-sectional view taken along the line O-A of FIG. 6.

The above described blower is of an axial flow fan motor type. However, the present invention is not limited to this application. Namely, it is possible to apply the present invention widely. An example thereof will be described with reference to FIGS. 6 and 7. FIG. 6 shows an entire appearance of an impeller 8A and FIG. 7 is a half-cross-sectional view showing the impeller 8A a part of which has been removed. This impeller 8A is provided with a number of arcuate blades 10A mounted radially on its body 9A.

Figure 8:
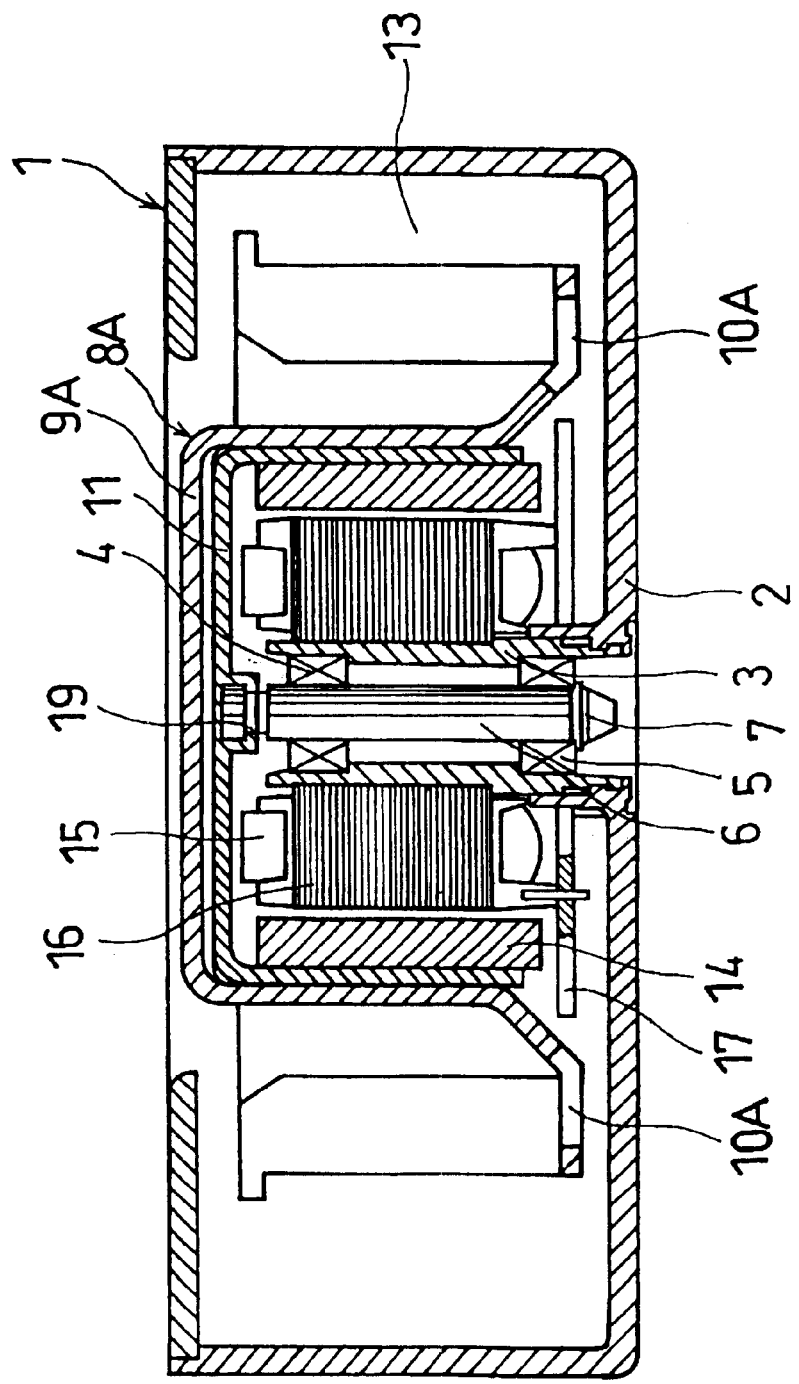
FIG. 8 is a longitudinal sectional view showing an embodiment in which the impeller shown in FIG. 6 is used.

FIG. 8 shows a blower using this impeller 8A. The same reference symbols as in FIG. 1 are used to indicate the like portions. In such an impeller also, the annular groove 19 is formed in the shaft 6 having uniform diameter. The body 9a of the impeller 8A that is formed into a cup-shape is fixed by press-fitting to the annular groove 19. The present invention makes it possible to fix the body 9A (corresponding to the motor yoke 11 in accordance with the foregoing embodiment) easily on the shaft 6 even if the blower is of the above described type.

The arrangement of the blower has been described above. Therefore, according to the first aspect of the invention, since the zinc die-cast-made boss that has been needed in the conventional art may be dispensed with, it is possible to perform the assembling work of the motor yoke or the body to the shaft with ease and without fail. Then, with respect to the shape of the annular groove, it is easy to manufacture the annular groove if it takes the structure according to the second aspect of the present invention, and the coupling strength between the shaft and the motor yoke may be enhanced if it takes the structure according to the third aspect of the invention.

What is claimed is:

1. A blower comprising:
    a cylindrical casing;
    bearings arranged in the center of the casing;
    a shaft supported by said bearings, said shaft having an annular groove at one end thereof;
    a motor yoke having a central portion;
    an impeller body fixed to the motor yoke; and
    wherein the central portion of said motor yoke is press-fitted and fixed to the annular groove of said shaft.

2. A blower according to claim 1, wherein the annular groove has a V-shape.

3. A blower according to claim 1, wherein the annular groove has an arcuate shape.

4. A blower according to claim 1, wherein the shaft has a uniform diameter.

5. A blower according to claim 1, wherein the motor yoke is cup-shaped.

6. A blower according to claim 1, further comprising:
    a housing formed integrally with said casing, said housing having a central portion; and a liner fitted to the central portion of said housing, said liner supporting said bearings.

* * * * *